(12) United States Patent
Kreikemeier et al.

(10) Patent No.: US 6,853,883 B2
(45) Date of Patent: Feb. 8, 2005

(54) METHOD AND MEANS FOR READING THE STATUS OF AND CONTROLLING IRRIGATION COMPONENTS

(75) Inventors: Bruce Kreikemeier, West Point, NE (US); Marv Schulz, Omaha, NE (US); Craig Malsam, Omaha, NE (US); Hector Haget, Omaha, NE (US)

(73) Assignee: Valmont Industries, Inc., Valley, NE (US)

( * ) Notice: Subject to any disclaimer, the term of this patent is extended or adjusted under 35 U.S.C. 154(b) by 539 days.

(21) Appl. No.: 09/778,367

(22) Filed: Feb. 7, 2001

(65) Prior Publication Data

US 2002/0107586 A1 Aug. 8, 2002

(51) Int. Cl.[7] .............................. G05D 11/00; G05D 7/00
(52) U.S. Cl. ........................ 700/284; 700/65; 702/188; 340/3.1; 340/3.71; 340/3.9
(58) Field of Search ............................. 700/17, 65, 83, 700/284, 264, 19; 702/188; 340/3.1, 3.9, 3.71, 825.72

(56) References Cited

U.S. PATENT DOCUMENTS

| | | | | |
|---|---|---|---|---|
| 4,209,131 A | * | 6/1980 | Barash et al. ................. | 239/68 |
| 4,244,022 A | * | 1/1981 | Kendall ....................... | 700/284 |
| 4,626,984 A | * | 12/1986 | Unruh et al. .................. | 700/3 |
| 4,760,547 A | * | 7/1988 | Duxbury ...................... | 700/284 |
| 5,479,338 A | * | 12/1995 | Ericksen et al. ............... | 700/16 |
| 5,737,707 A | * | 4/1998 | Gaulke et al. ............ | 455/556.1 |
| 5,760,706 A | * | 6/1998 | Kiss ....................... | 340/825.69 |
| 6,108,590 A | * | 8/2000 | Hergert ....................... | 700/284 |
| 6,141,614 A | * | 10/2000 | Janzen et al. .................. | 701/50 |
| 6,173,727 B1 | * | 1/2001 | Davey ............................ | 137/1 |
| 6,236,332 B1 | * | 5/2001 | Conkright et al. ........... | 340/3.1 |
| 6,337,971 B1 | * | 1/2002 | Abts ........................... | 340/7.2 |
| 6,343,255 B1 | * | 1/2002 | Peek et al. ..................... | 702/3 |
| 6,437,692 B1 | * | 8/2002 | Petite et al. ................. | 340/540 |
| 6,453,215 B1 | * | 9/2002 | Lavoie ....................... | 700/284 |
| 6,529,589 B1 | * | 3/2003 | Nelson et al. ......... | 379/102.01 |
| 6,553,336 B1 | * | 4/2003 | Johnson et al. ............. | 702/188 |
| 6,600,971 B1 | * | 7/2003 | Smith et al. ................. | 700/284 |
| 6,633,786 B1 | * | 10/2003 | Majors et al. ................ | 700/79 |
| 6,701,665 B1 | * | 3/2004 | Ton et al. ...................... | 47/17 |

* cited by examiner

Primary Examiner—Anthony Knight
Assistant Examiner—Crystal J. Barnes
(74) Attorney, Agent, or Firm—Thomte, Mazour & Niebergall; Dennis L. Thomte

(57) ABSTRACT

A method and means is disclosed for remotely reading the status of and controlling irrigation components and ancillary equipment. A handheld remote user interface (RUI) is provided which includes a display and a keypad. The RUI has the ability to communicate with and control the irrigation components using built-in wireless telemetry technology. The RUI allows the user to read the status of and control the irrigation components and ancillary equipment from any location in the field, without requiring the user to be at the irrigation component controls or at a specific location in the field.

4 Claims, 1 Drawing Sheet

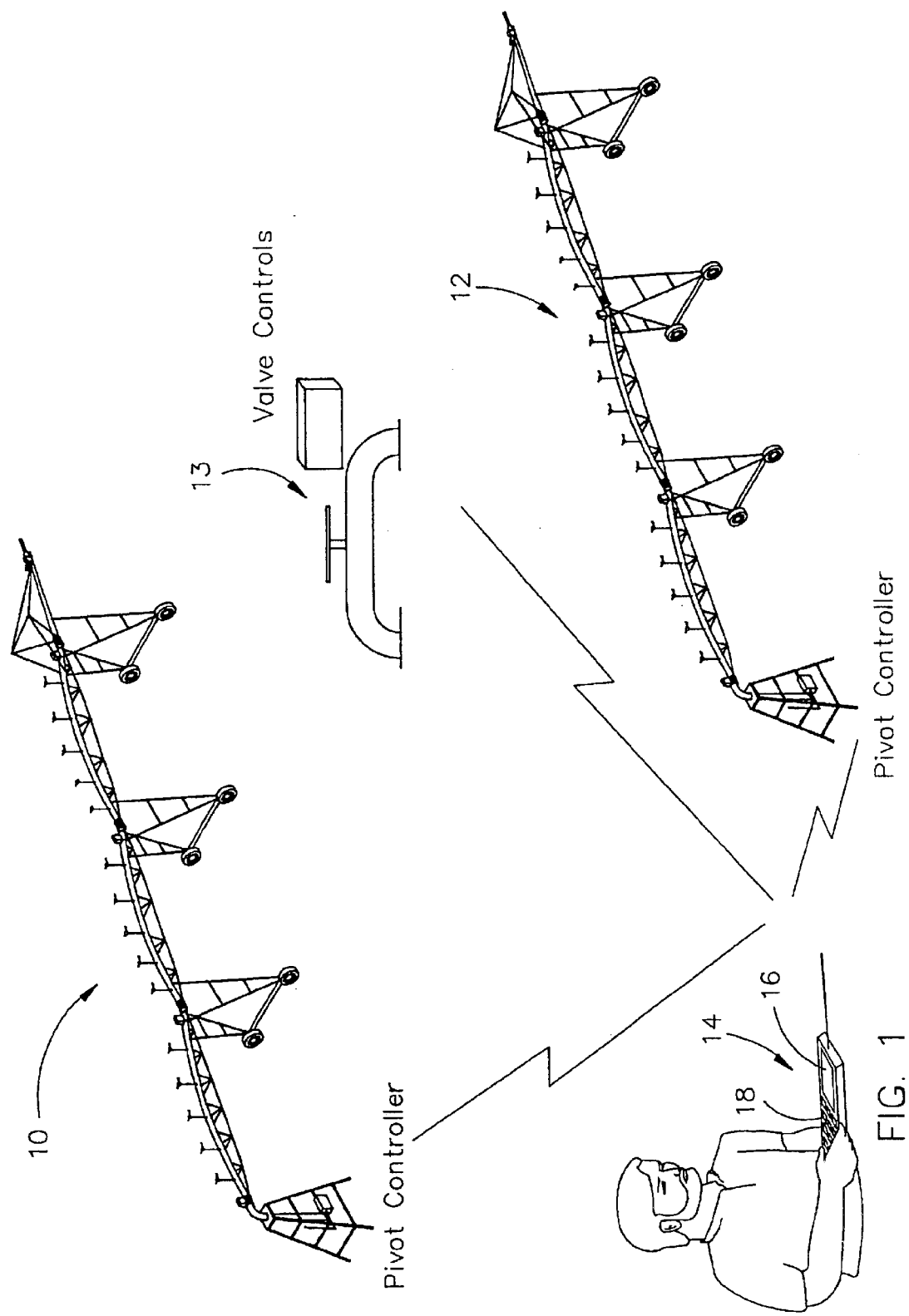

METHOD AND MEANS FOR READING THE STATUS OF AND CONTROLLING IRRIGATION COMPONENTS

BACKGROUND OF THE INVENTION

1. Field of the Invention

This invention relates to a method and means for reading the status of and remotely controlling irrigation components and ancillary equipment including, but not limited to, center pivots, linears, drip sectors, pumps, engine generators, valves, pressure sensors, etc., by means of a remote, hand-held controller.

2. Description of the Related Art

Devices have been previously provided for the remote control of irrigation systems and components thereof. One prior art device for remotely controlling irrigation systems is the base station control. The base station control utilizes RF telemetry or cell phone telemetry to read the status of and control irrigation components from a personal computer (PC). The disadvantage of this method is that the user needs to be at the PC. Situations arise whereby after viewing the operation of the irrigation components, immediate action is needed. The base station control system requires the user to go back to the PC, which may be located miles away, for remote control capability.

A second type of system is known as the remote mount control panel system. Remote mount control panels consist of mounting the control panels of the components at a location in the field away from the components to thereby provide relatively easy access to the control panels. This requires burying the power and control wires in the field. This method also limits access to the control panels to one particular location, that being the location of the remote mounted control panel.

SUMMARY OF THE INVENTION

A method and means is disclosed for reading the status of and remotely controlling irrigation components and ancillary equipment. The means for remotely reading the status of and controlling irrigation components and ancillary equipment comprises a remote user interface (RUI) which is a separate unit from the irrigation component controller. The RUI consists of a handheld display and keypad. The RUI has the ability to communicate with and control the irrigation components using built-in wireless telemetry technology. The RUI allows the user to read the status of, communicate with, and control irrigation components from any location in the field, without requiring the user to be at the irrigation component controls or at a specific location in the field. The method of this invention enables a person to determine the status of irrigation components and ancillary equipment and to control the operation thereof, which comprises the steps of: (1) providing a handheld wireless RUI; (2) utilizing the RUI to read the status of the irrigation components and ancillary equipment; and (3) utilizing the RUI to communicate with the irrigation components and ancillary equipment for controlling the operation thereof.

It is therefore a principal object of the invention to provide a method and means for remotely reading the status of and controlling irrigation components and ancillary equipment by means of a remote user interface (RUI).

Still another object of the invention is to provide a remote user interface for irrigation components which is a separate unit from the irrigation component controller.

Still another object of the invention is to provide a remote user interface for irrigation components which consists of a handheld display and keypad having the ability to communicate with the irrigation components and control the same through the use of built-in wireless telemetry technology.

Still another object of the invention is to provide a method and means for remotely controlling irrigation components and ancillary equipment which allows the user to read the status of, communicate with, and control irrigation components from any location in the field without requiring the user to be at the irrigation component controls or at a specific location in the field.

These and other objects will be apparent to those skilled in the art.

BRIEF DESCRIPTION OF THE DRAWINGS

FIG. 1 illustrates the RUI of this invention being employed by a user to read the status of irrigation components and ancillary equipment to enable the user to control the operation thereof.

DESCRIPTION OF THE PREFERRED EMBODIMENT

In the drawings, the numerals 10 and 12 refer to irrigation components such as center pivot irrigation systems including ancillary equipment 13. The method and means of this invention is used to control irrigation components and ancillary equipment which may be center pivots, linear systems, drip sectors, pumps, engine generators, valves, pressure sensors, etc.

In an effort to overcome the shortcomings of the base station control systems and the remote mount control panels of the prior art, a remote user interface (RUI) 14 is provided which includes a display 16 and a keypad 18, as seen in FIG. 1. The RUI is a handheld device to enable the user to utilize the same in a convenient manner. The RUI 14 has the capability of communicating with and controlling the irrigation components and ancillary equipment using conventional built-in wireless telemetry technology. Through the use of the RUI, the user may remotely read or determine the status of, communicate with, and control the irrigation components and ancillary equipment from any location in the field, without requiring the user to be at the irrigation component controls or at a specific location in the field.

Thus, it can be appreciated that if the user visits a site wherein an irrigation system is located, and visually determines that the system is functioning improperly, the user may use the RUI 14 to determine the status of, communicate with, and control the irrigation components of the system from any location in the field. Further, depending upon the range of the RUI, the user could determine the status of, communicate with, and control the irrigation components from a location other than in or adjacent to the field. However, it is contemplated that the device will normally be used by the user at the particular system location.

Thus it can be seen that the invention accomplishes at least all of its stated objectives.

We claim:

1. In combination with mechanized irrigation components and ancillary equipment therefore for irrigating a field, comprising:
   a single wireless RUI comprising a handheld display and keypad for:
   (a) reading the status of irrigation components and ancillary equipment; and
   (b) directly transmitting telemetry to said irrigation components and ancillary equipment to control said irrigation components and ancillary equipment; and
   (c) displaying said status of said irrigation components and ancillary equipment.

2. The combination of claim 1 wherein said wireless RUI has the capability of reading the status of the irrigation components and ancillary equipment and controlling the same from any location in the field.

3. In combination with mechanized irrigation components for irrigating a field, comprising:

a single wireless RUI comprising a handheld display and keypad having the capability of:
(a) reading the status of the irrigation components;
(b) directly transmitting telemetry to said irrigation components to control the operation of the irrigation components; and
(c) displaying said status of the irrigation components.

4. The method whereby a person may remotely determine the status of mechanized irrigation components and ancillary equipment and for controlling the operation thereof, comprising the steps of:

providing a single handheld wireless RUI;

utilizing said RUI to read the status of the irrigation components and ancillary equipment; and utilizing said RUI to directly transmit telemetry to said irrigation components and ancillary equipment to control the irrigation components and ancillary equipment.

* * * * *